US011459046B1

(12) United States Patent
Popoff et al.

(10) Patent No.: US 11,459,046 B1
(45) Date of Patent: Oct. 4, 2022

(54) SERVICE TABLE FOR TRANSPORTING A BATTERY PACK OF A MOTOR VEHICLE ALONG A FLOOR SURFACE

(71) Applicant: GM Global Technology Operations LLC, Detroit, MI (US)

(72) Inventors: Daniel J Popoff, Canton, MI (US); Corey Schlichter, Faribault, MN (US); Corday Peterson, Faribault, MN (US); Joseph Lee, Minneapolis, MN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/376,840

(22) Filed: Jul. 15, 2021

(51) Int. Cl.
*B62D 65/02* (2006.01)
*B62B 3/02* (2006.01)
*B62B 3/00* (2006.01)

(52) U.S. Cl.
CPC ............ *B62D 65/022* (2013.01); *B62B 3/002* (2013.01); *B62B 3/02* (2013.01)

(58) Field of Classification Search
CPC . B62B 3/007; B62B 3/02; B62B 3/002; B66F 7/28
See application file for complete search history.

(56) References Cited

U.S. PATENT DOCUMENTS

| | | | |
|---|---|---|---|
| 5,485,655 A * | 1/1996 | Wang ................. | E05D 11/1007 5/98.1 |
| 5,738,365 A * | 4/1998 | McCarthy .............. | B62B 3/022 280/651 |
| 5,915,723 A * | 6/1999 | Austin ...................... | B62B 3/02 280/47.35 |
| 6,073,943 A * | 6/2000 | Serrault ................... | B65F 1/122 280/30 |
| 6,328,319 B1 * | 12/2001 | Stabler, Sr. ............... | B62B 1/12 280/47.27 |
| 6,733,026 B1 * | 5/2004 | Robberson .............. | B62B 3/007 280/30 |
| 6,851,564 B2 * | 2/2005 | Ng .......................... | B62B 3/005 108/171 |
| 7,731,221 B2 * | 6/2010 | Bess ......................... | B62B 3/02 280/30 |
| 8,091,916 B2 * | 1/2012 | Shapiro .................... | B62B 3/007 280/87.05 |

(Continued)

*Primary Examiner* — Moshe Wilensky
*Assistant Examiner* — Michael W Hotchkiss
(74) *Attorney, Agent, or Firm* — Vivacqua Crane PLLC (57) ABSTRACT

A service table for transporting a battery pack comprises four frame members arranged end-to-end in a circuit, four hinges between adjacent frame members, and wheels. The service table further comprises a support bed mounted to at least one of the frame members and configured to support the battery pack. At least one hinge lock is disposed between adjacent frame members and arranged to be rigidly fixed to both of the adjacent frame members in a locked configuration and arranged to be decoupled from at least one of the adjacent frame members in an unlocked configuration. The frame members are arranged in a service configuration having a first width when the hinge lock is arranged in the locked configuration for transporting the battery pack thereon and in a storage configuration having a second width, less than the first width, when the hinge lock is arranged in the unlocked configuration.

17 Claims, 7 Drawing Sheets

(56) References Cited

U.S. PATENT DOCUMENTS

| | | | |
|---|---|---|---|
| 8,523,197 B2 * | 9/2013 | Baatz | B62B 3/025 |
| | | | 280/42 |
| 8,602,443 B2 * | 12/2013 | Moore | B62B 3/002 |
| | | | 280/651 |
| 8,820,774 B2 * | 9/2014 | Schonhardt | B62B 5/065 |
| | | | 280/47.18 |
| 8,973,940 B2 * | 3/2015 | Chen | B62B 3/02 |
| | | | 280/638 |
| 9,103,368 B2 * | 8/2015 | Mendes | A47D 13/061 |
| 9,428,205 B2 * | 8/2016 | Jackson | B62B 3/004 |
| 9,573,610 B1 * | 2/2017 | Chaturvedi | B62B 3/022 |
| 9,714,585 B2 * | 7/2017 | Morey | F01D 25/285 |
| 10,328,570 B1 * | 6/2019 | O'Donnell | B25H 5/00 |
| D879,885 S * | 3/2020 | Ostergaard | D21/425 |
| 10,604,170 B1 * | 3/2020 | Davis | B62B 3/008 |
| 11,192,566 B2 * | 12/2021 | Ceja | B62B 3/008 |
| 2002/0158446 A1 * | 10/2002 | Stravitz | B62B 3/04 |
| | | | 280/42 |
| 2009/0066114 A1 * | 3/2009 | Molton | B62B 3/022 |
| | | | 296/180 |
| 2010/0283227 A1 * | 11/2010 | Perelli | B62B 3/025 |
| | | | 280/639 |
| 2013/0074257 A1 * | 3/2013 | Mendes | A47D 13/061 |
| | | | 16/349 |
| 2015/0225004 A1 * | 8/2015 | Dunford | B62B 3/002 |
| | | | 280/42 |
| 2020/0231079 A1 * | 7/2020 | Lai | B62B 3/02 |
| 2021/0253189 A1 * | 8/2021 | Miller | B62B 3/008 |
| 2021/0380154 A1 * | 12/2021 | Palumbo, Jr. | B62B 5/026 |

* cited by examiner

SERVICE TABLE FOR TRANSPORTING A BATTERY PACK OF A MOTOR VEHICLE ALONG A FLOOR SURFACE

INTRODUCTION

The present disclosure relates to a service table, and more particularly to a service table for transporting a battery pack of a motor vehicle along a floor surface.

In recent years, the use of electric motors to power vehicles has increased exponentially. To power the electric motors, battery packs comprised of numerous battery cells are utilized, making the battery pack have considerable weight. In many instances, the battery pack weighs over 1,000 pounds, making removal of the battery pack from the vehicle difficult and dangerous to service technicians.

Current practices to remove the battery pack include the use a cart to place the battery pack on after disconnecting the battery pack from the vehicle. However, this still requires some amount of manipulation of the cart or the battery pack by the service technician to ensure the battery pack does not fall out the vehicle. Furthermore, carts that are sized to support the battery pack typically occupy a considerable amount of surface area within a service department or repair shop. Storing the cart when not in use occupies surface area that could be used for another vehicle to be serviced, which decreases the operable capacity of the service department or repair shop.

Thus, while current carts achieve their intended purpose, there is a need for a new service table that addresses these issues.

SUMMARY

According to several aspects of the present disclosure, a service table for transporting a battery pack of a motor vehicle along a floor surface comprises at least four frame members extending longitudinally in a substantially horizontal configuration and arranged end-to-end in a circuit. The service table further comprises at least four hinges individually disposed between and mounted to adjacent frame members to facilitate pivoting between adjacent frame members and a plurality of wheels mounted to frame members and arranged to rotate along the floor surface. The service table further comprises a support bed mounted to at least one of the frame members and configured to support the battery pack. The service table further comprises at least one hinge lock, with the hinge lock disposed between adjacent frame members and arranged to be rigidly fixed to both of the adjacent frame members in a locked configuration to inhibit pivoting of the adjacent frame members and arranged to be decoupled from at least one of the adjacent frame members in an unlocked configuration to allow pivoting of the adjacent frame members. The frame members are arranged in a service configuration having a first width when the hinge lock is arranged in the locked configuration for transporting the battery pack thereon. The frame members are arranged in a storage configuration having a second width, less than the first width, when the hinge lock is arranged in the unlocked configuration.

In one aspect, the at least four frame members comprise a pair of end frame members that are substantially parallel to one another and a pair of side frame members that are substantially parallel to one another. The end and side frame members are arranged as a parallelogram and the pair of side frame members define the first and second widths.

In another aspect, the end frame members are orthogonal to the side frame members in the service configuration and the end frame members are non-orthogonal to the side frame members in the storage configuration.

In another aspect, the at least one hinge lock comprises a plate fixed to one of the adjacent frame members and extending toward the other one of the adjacent frame members. Each of the hinge lock and the other one of the adjacent frame members comprise a mating surface arranged to align in the service configuration to fix the plate with the other one of the adjacent frame members.

In another aspect, each of the mating surfaces define a hole, with the holes axially aligned in the service configuration. The service table further comprises a pin that extends through the holes in the service configuration and engages the mating surfaces to fix the plate with the other one of the adjacent frame members.

In another aspect, the at least one hinge lock is further defined as multiple hinge locks individually disposed at each of the hinges.

In another aspect, the support bed extends between and is mounted to two of the frame members.

In another aspect, the support bed is pivotally mounted to the frame members to facilitate the pivoting of the frame members at the hinges.

In another aspect, each of the two frame members define a plurality of apertures spaced from one another longitudinally along the frame members and the support bed further comprises a first post arranged to be selectively disposed in the apertures of one of the two frame members and a second post arranged to be selectively disposed in the apertures of the other one of the two frame members for selectively adjusting the position of the support bed along the two frame members.

In another aspect, the support bed further comprises a rail extending between and mounted to the two frame members, a tray disposed above the rail, and an actuator coupled to both of the rail and the tray for positioning a height of the tray above the rail.

In another aspect, the actuator is further defined as a first actuator and the service table further comprises a second actuator spaced from the first actuator along the rail. The first and second actuators are individually vertically adjustable for adjusting an angle of the tray relative to the rail.

In another aspect, the actuator is further defined as a screw jack, with rotation of the screw jack arranged to adjust the height of the tray above the rail.

In another aspect, the support bed is further defined as a first support bed and the service table further comprises a second support bed extending between and mounted to the two frame members. The first and second support beds are arranged to individually move along the two frame members to accommodate varying shapes and sizes of the battery pack.

In another aspect, the plurality of wheels comprises at least one caster wheel arranged to mount to the frame members and rotatable around a caster axis for turning the service table on the floor surface.

In another aspect, the service table further comprises a caster lock coupled to the caster wheel for retaining the caster wheel in a fixed rotational position about the caster axis.

In another aspect, the caster lock comprises a plate mounted to the caster wheel and defining a plurality of notches spaced about the caster axis and pin slidably mounted to one of the frame members and arranged to slide into one of the notches when the caster wheel is in a rotational position about the caster axis that aligns the pin with the notch. The plurality of notches are each associated with a different rotational position of the caster wheel.

In another aspect, the service table further comprises a plurality of brakes, each individually operably coupled to the plurality of wheels. The brakes are arranged to be selectively actuated and engage the wheels to inhibit rotation along the floor surface.

In another aspect, the plurality of wheels and the plurality of brakes are further defined as at least four wheels and at least four brakes, respectively, with the wheels and the brakes individually disposed adjacent the hinges to facilitating pivoting of the frame members between the service and storage configurations.

In another aspect, the service table further comprises a brake lever having a handle and a linkage extending along one of the frame members toward the two hinges mounted to the frame member. The linkage is coupled to the brakes of the wheels adjacent the two hinges with the brake lever and the linkage arranged to simultaneously actuate the brakes and engage the wheels.

According to several aspects of the present disclosure, a service table for transporting a battery pack of a motor vehicle along a floor surface comprises at least four frame members extending longitudinally in a substantially horizontal configuration and arranged end-to-end in a circuit. The service table further comprises at least four hinges individually disposed between and mounted to adjacent frame members to facilitate pivoting between adjacent frame members and a plurality of wheels mounted to frame members and arranged to rotate along the floor surface. The service table further comprises a support bed mounted to at least one of the frame members and configured to support the battery pack. The service table further comprises at least one hinge lock, with the hinge lock disposed between adjacent frame members and arranged to be rigidly fixed to both of the adjacent frame members in a locked configuration to inhibit pivoting of the adjacent frame members and arranged to be decoupled from at least one of the adjacent frame members in an unlocked configuration to allow pivoting of the adjacent frame members. The frame members are arranged in a service configuration having a first width when the hinge lock is arranged in the locked configuration for transporting the battery pack thereon. The frame members are arranged in a storage configuration having a second width, less than the first width, when the hinge lock is arranged in the unlocked configuration. The at least one hinge lock comprises a plate fixed to one of the adjacent frame members and extending toward the other one of the adjacent frame members, with each of the hinge lock and the other one of the adjacent frame members comprising a mating surface arranged to align in the service configuration to fix the plate with the other one of the adjacent frame members, with each of the mating surfaces defining a hole, with the holes axially aligned in the service configuration, and further comprising a pin that extends through the holes in the service configuration and engages the mating surfaces to fix the plate with the other one of the adjacent frame members. The support bed further comprises a rail extending between and pivotally mounted to the two frame members to facilitate the pivoting of the frame members at the hinges, a tray disposed above the rail, and an actuator coupled to both of the rail and the tray for positioning a height of the tray above the rail.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
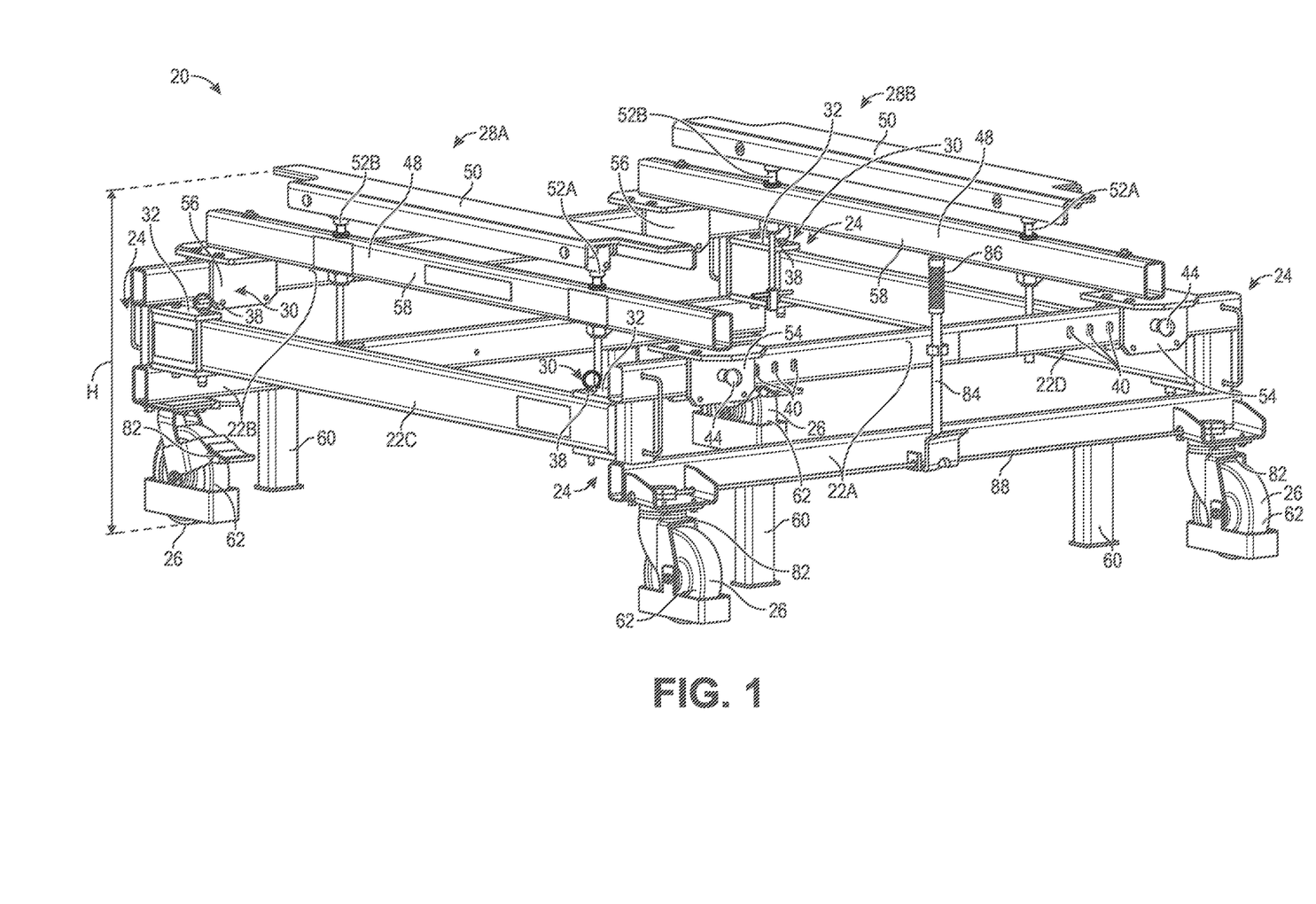
FIG. 1 is a perspective view of one example of a service table having four frame members, two support beds, and four wheels and disposed in a service configuration.
Figure 2:
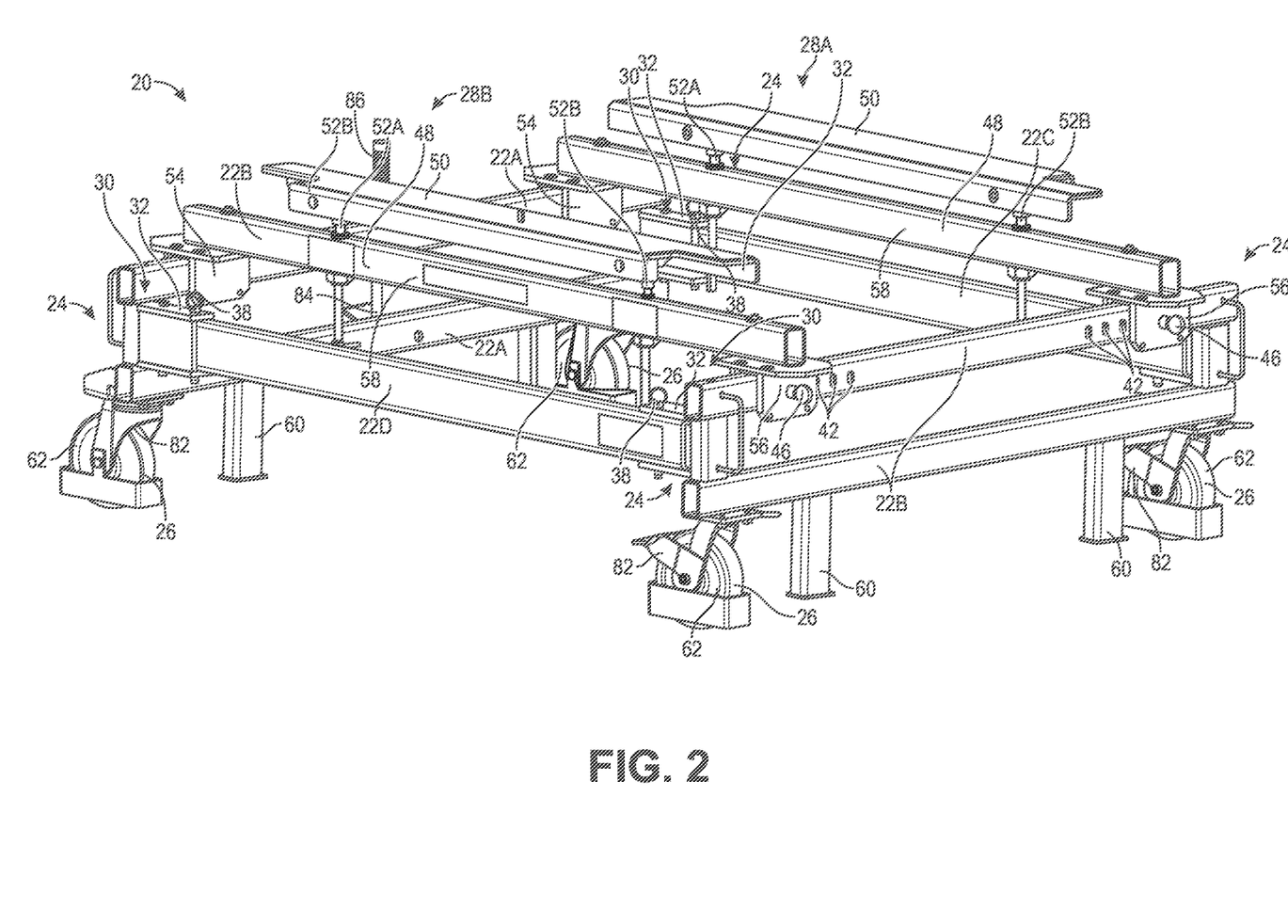
FIG. 2 is another perspective view of the service table of FIG. 1.

Referring to FIGS. 1 and 2, a service table 20 for transporting a battery pack (not shown) of a motor vehicle (not shown) along a floor surface is shown generally at 20. More specifically, the service table 20 is configured for transporting the battery pack of an electric vehicle. Most modern electric vehicles comprise one or more electric motors that rotate the wheels 26. The electric motor(s) are powered by one or more of the battery pack. To provide sufficient power to the electric motor(s), the battery pack is comprised of numerous battery cells, making the battery pack have considerable weight. More specifically, the battery pack may weigh several hundred pounds. In several examples, the battery pack weighs over 1,000 pounds. To lower the center of gravity of the vehicle and thereby improve the stability of the vehicle, the battery pack is commonly positioned low on vehicle. More specifically, the battery pack is commonly mounted to a chassis of the vehicle below the passenger and cargo compartments. The battery pack may be accessed from below the vehicle. Removal of the battery pack may occur by disconnecting the battery pack from the chassis and then lowering the battery pack from the chassis or raising the chassis off the battery pack. The service table 20 is configured to support the battery pack when the battery pack is disassembled from the vehicle.

In one example, to remove the battery pack, the service table 20 is positioned under the vehicle and beneath the battery pack. If the vehicle is not tall enough provide sufficient clearance for positioning the service table 20 beneath the battery pack, the vehicle may be raised to provide clearance (e.g., with an overhead vehicle lift, jacks, etc.). With the service table 20 beneath the battery pack, the battery pack is brought into contact with the service table 20 by lowering vehicle toward the service table 20, adjusting the service table 20 upwards toward the vehicle (which is described in greater detail below), or a combination of both. The battery back is disconnected from the chassis. The chassis is then raised until chassis is disposed above the battery pack and sufficient clearance is present to move the service table 20 and the battery pack from beneath the vehicle. To install the battery pack into the vehicle, the opposite is true. More specifically, with the vehicle raised, the service table 20 and the battery pack are moved under the vehicle. The vehicle is then lowered until the battery pack is disposed within the chassis and may be mounted to the chassis. The vehicle is raised to disengage the service table 20 or the service table 20 is adjusted downward away from the vehicle (which is described in greater detail below). The service table 20 is moved from beneath the vehicle and the vehicle is placed on the floor surface.

Figure 3:
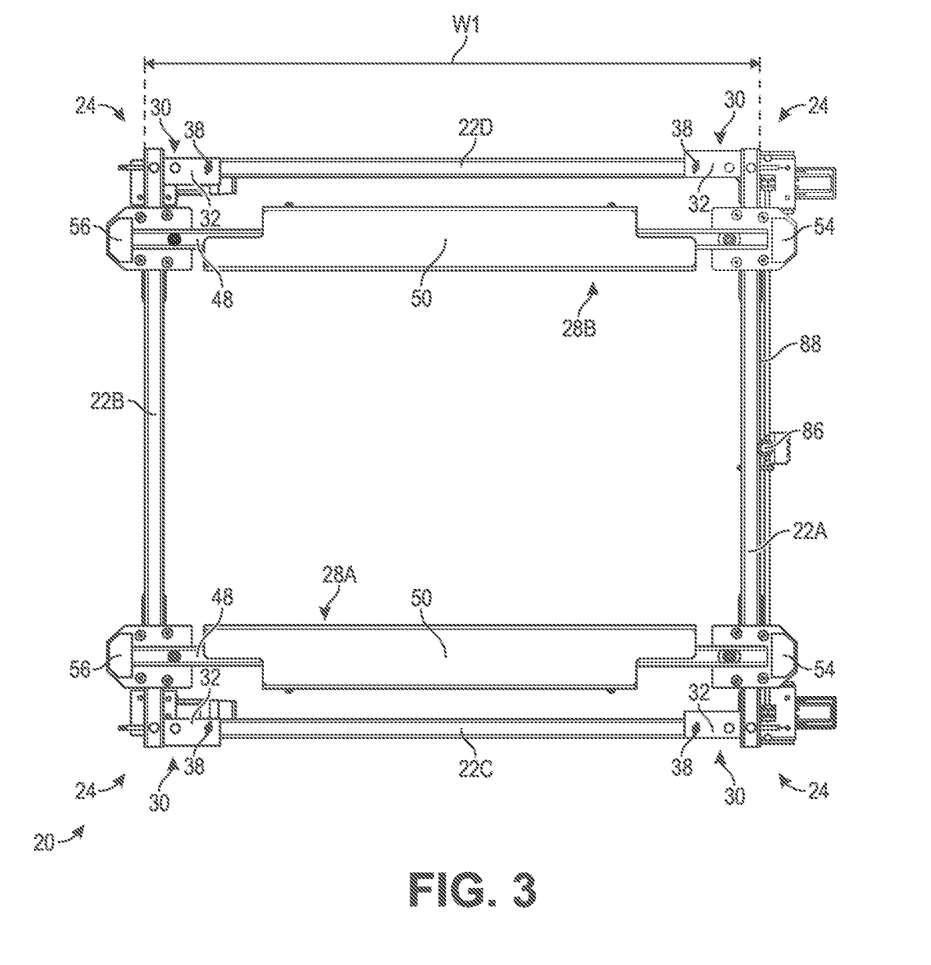
FIG. 3 is a top plan view of the service table of FIG. 1, showing the support beds spaced from another disposed adjacent side frame members of the four frame members.
Figure 4:
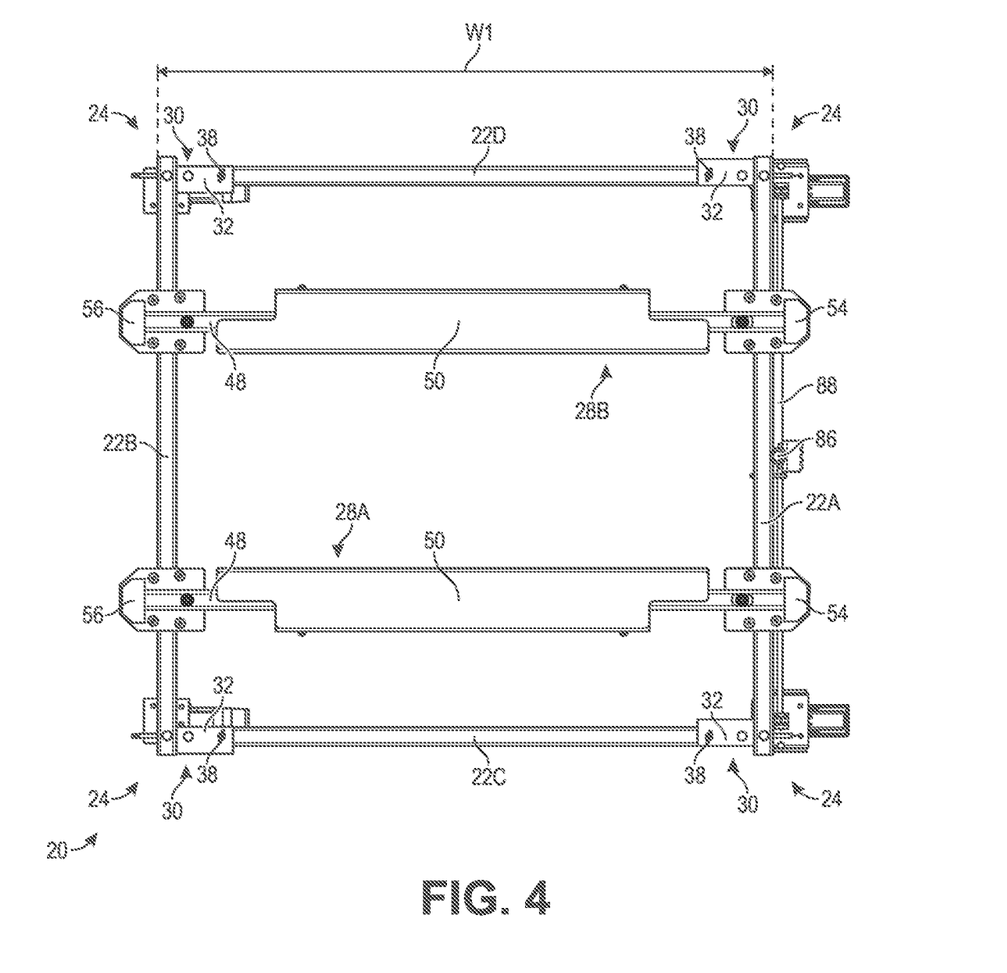
FIG. 4 is a top plan view of the service table of FIG. 1, showing the support beds spaced from the side frame members and closer to one another than shown in FIG. 3.

The service table 20 comprises at least four frame members 22A-D extending longitudinally in a substantially horizontal configuration and arranged end-to-end in a circuit. The service table 20 further comprises at least four hinges 24 individually disposed between and mounted to adjacent frame members 22A-D to facilitate pivoting between adjacent frame members 22A-D and a plurality of wheels 26 mounted to frame members 22A-D and arranged to rotate along the floor surface. The service table 20 further comprises a support bed 28 mounted to at least one of the frame members 22A-D and configured to support the battery pack. The service table 20 further comprises at least one hinge lock 30, with the hinge lock 30 disposed between adjacent frame members 22A-D and arranged to be rigidly fixed to both of the adjacent frame members 22A-D in a locked configuration to inhibit pivoting of the adjacent frame members 22A-D and arranged to be decoupled from at least one of the adjacent frame members 22A-D in an unlocked configuration to allow pivoting of the adjacent frame members 22A-D. The frame members 22A-D are arranged in a service configuration having a first width W1 when the hinge lock 30 is arranged in the locked configuration for transporting the battery pack thereon, as shown in FIGS. 3 and 4. The frame members 22A-D are arranged in a storage configuration having a second width W2, less than the first width W1, when the hinge lock 30 is arranged in the unlocked configuration, as shown in FIG. 5.

The transformation of the service table 20 between the service and storage configurations is advantageous in vehicle service departments where the space within the building must be optimized to service the maximum number of vehicles. More specifically, if the service table 20 were to continuously remain in the service configuration, the service table 20 would occupy a considerable amount of surface area within the vehicle service department. The surface area would be roughly equivalent to that of a small vehicle. As such, if the service table 20 were to remain in the service configuration, the service table 20 would be stored in a vehicle bay that should be used to service a vehicle, thus reducing the maximum capacity of the vehicle service department. This problem is compounded when the vehicle service department requires multiple service tables 20 to service the battery packs of multiple vehicles that may be in the vehicle service department for repair at any given time.

In the example shown in the Figures, the at least four frame members 22A-D comprise a pair of end frame members 22A, 22B that are substantially parallel to one another and a pair of side frame members 22C, 22D that are substantially parallel to one another. The end and side frame members 22A-D are arranged as a parallelogram and the pair of side frame members 22C, 22D define the first and second widths W1, W2. The end frame members 22A, 22B are orthogonal to the side frame members 22C, 22D in the service configuration and the end frame members 22A, 22B are non-orthogonal to the side frame members 22C, 22D in the storage configuration. However, the end frame members 22A, 22B and the side frame members 22C, 22D may be arranged to be disposed in any other shape of configuration suitable for supporting the battery pack.

Figure 5:
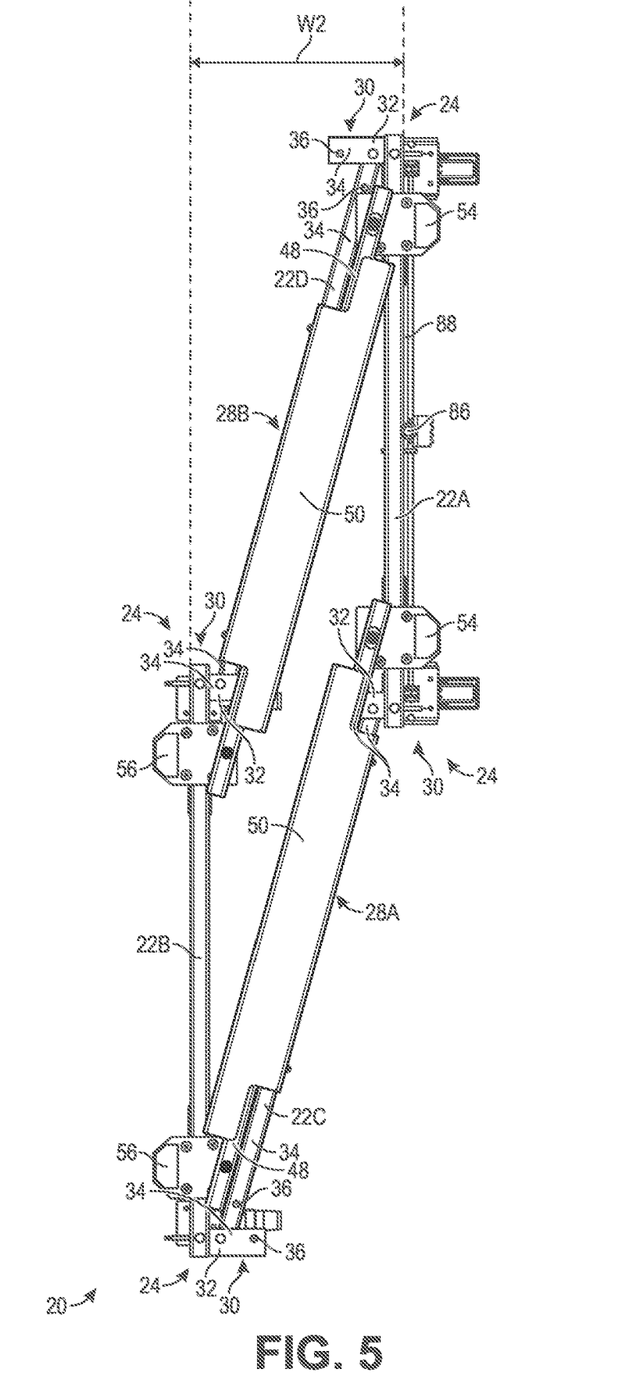
FIG. 5 is a top plan view of the service table of FIG. 1, showing the frame members pivoted into a storage configuration.

As shown in FIGS. 3-5, the at least one hinge lock 30 may comprise a plate 32 fixed to one of the adjacent frame members 22A-D and extending toward the other one of the adjacent frame members 22A-D. Each of the hinge lock 30 and the other one of the adjacent frame members 22A-D may comprise a mating surface 34 arranged to align in the service configuration to fix the plate 32 with the other one of the adjacent frame members 22A-D. Each of the mating surfaces 34 may define a hole 36 as shown in FIG. 5, with the holes 36 axially aligned in the service configuration. The service table 20 further comprises a pin 38 that extends through the holes 36 in the service configuration and engages the mating surfaces 34 to fix the plate 32 with the other one of the adjacent frame members 22A-D. In the example shown in the Figures, the pin 38 is configured as a detent pin arranged to resist being withdrawn from the holes 36 unless a threshold force is exerted on the detent pin by a user. Thus, the detent pin may be easily removed by the user to alternate the service table 20 between the service and storage configurations while preventing inadvertent conversion between the configurations without the overt removal of the detent pin by the user. However, any suitable fastener may be used as the pin 38, such as a dowel or a bolt.

In the example shown in the Figures and described above, the frame members 22A-D are arranged as a parallelogram. The disposition of the hinge lock 30 at one of the hinges 24 and the arrangement of the hinge lock 30 to be rigidly fixed to both of the adjacent frame members 22A-D in a locked configuration inhibits pivoting of the adjacent frame members 22A-D at the hinge 24, as well as at each of the other three hinges 24. Said differently, the frame members 22A-D arranged as the parallelogram form a four-bar linkage. Inhibiting pivoting between two adjacent links of a four-bar linkage inhibits pivoting between the other links. Accordingly, a single hinge lock 30 may be utilized to rigidly fixed all the frame members 22A-D in the locked configuration and inhibit pivoting therebetween. However, the at least one hinge lock 30 may be further defined as multiple hinge locks 30 individually disposed at each of the hinges 24. For example, the service table 20 shown in the FIGS. 3-5 includes four hinge locks 30 individually disposed at each of the four hinges 24. The plurality of hinge locks 30 disperses torque applied to any of the frame members 22A-D. The greater the number of hinge locks 30, the greater the dispersion. Accordingly, reducing the torque on each of the hinge locks 30 allows for a greater amount of overall torque that can be applied to the frame members 22A-D, which reduces the possibility of the hinge locks 30 failing and the frame members 22A-D inadvertently pivoting into the storage configuration. Inadvertent pivoting into the storage configuration poses a safety concern when the battery pack is supported by the service table 20. Although the example shown in the Figures comprises hinge locks 30 disposed at each of the hinges 24, any number of hinge locks 30 may be utilized.

The support bed 28 may extend between and be mounted to two of the frame members 22A-D. In the example shown in FIGS. 1-5, the support bed 28 extends between and is mounted to the pair of end frame members 22A, 22B.

However, the support bed 28 may extend between and be mounted to the pair of side frame members 22C, 22D, or any other suitable frame members in examples not shown in the Figures.

The support bed 28 may be pivotally mounted to the frame members 22A-D to facilitate the pivoting of the frame members 22A-D at the hinges 24. More specifically, if the support bed 28 were rigidly fixed to the frame members 22A-D in the example shown in the Figures, the frame members 22A-D would not be able to move relative to one another, inhibiting pivoting.

As shown in FIGS. 1 and 2, each of the two frame members 22A-D may define a plurality of apertures 40, 42 spaced from one another longitudinally along the frame members 22A-D and the support bed 28 further comprises a first post 44 arranged to be selectively disposed in the apertures 40 of one of the two frame members 22A-D and a second post 46 arranged to be selectively disposed in the apertures 42 of the other one of the two frame members 22A-D for selectively adjusting the position of the support bed 28 along the two frame members 22A-D. The plurality of apertures 40, 42 provide a plurality of positions at which the support bed 28 may be disposed. An operator may adjust the position of the support bed 28 along the two frame members 22A-D by removing the first and second posts 44, 46 from the apertures 40, 42, sliding the support bed 28 along the two frame members 22A-D to a desired position with the first and second posts 44, 46 aligned with the apertures 40, 42, and disposing the first and second posts 44, 46 in the apertures 40, 42 to retain the support bed 28 in the desired position. In the example shown in the Figures, the apertures 40, 42 are defined by the pair of end frame members 22A, 22B, with the support bed 28 adjustable along the pair of end frame members 22A, 22B to selectively position the support bed 28 between the pair of side frame members 22C, 22D. The support bed 28 may be aligned with the apertures 40, 42 that position the support bed 28 parallel to the side frame members 22C, 22D. The support bed 28 may also be aligned with apertures 40, 42 that position the support bed 28 askew to the pair of side frame members 22C, 22D. The positioning of the support bed 28 at any of the positions defined by the apertures 40, 42 allows the support bed 28 to be configured to support various batteries having different sizes, shapes, and configurations.

In the example shown in FIGS. 1 and 2, the support bed 28 further comprises a rail 48 extending between and mounted to the two frame members 22A-D, a tray 50 disposed above the rail 48, and an actuator 52 coupled to both of the rail 48 and the tray 50 for positioning a height H of the tray 50 above the rail 48. The tray 50 is configured to engage and support the battery pack. The rail 48 supports the tray 50 through the actuator 52. The actuator 52 is arranged to extend and retract. Extension of the actuator 52 raises the tray 50 while retraction lowers the tray 50. More specifically, with the service table 20 disposed beneath the battery pack, the actuator 52 may be extended to bring the tray 50 in to contact with the battery pack to support the battery pack when the battery pack is disconnected from the chassis. The actuator 52 may be further defined as a screw jack, with rotation of the screw jack arranged to adjust the height H of the tray 50 above the rail 48. However, the actuator 52 may be configured in any suitable manner for adjusting the height H of the tray 50. Furthermore, the actuator 52 may be further defined as a first actuator 52A and the service table 20 may further comprise a second actuator 52B spaced from the first actuator 52A along the rail 48. The second actuator 52B may be similar to the first actuator 52A. Therefore, the description above regarding the first actuator 52A may be applicable to the second actuator 52B. The first and second actuators 52A, 52B are individually vertically adjustable for adjusting an angle of the tray 50 relative to the rail 48. As such, the first and second actuators 52A, 52B configure the tray 50 to evenly contact the battery pack, even if the battery pack is not parallel to the floor surface.

As mentioned above, the support bed 28 may be pivotally mounted to the frame members 22A-D. More specifically, the rail 48 may comprise a pair of plates 54, 56 slidably disposed on the two frame members 22A-D. The first post 44 is disposed on one of the pair of plates 54 and is arranged to be selectively disposed in the apertures 40, 42 of one of the two frame members 22A-D. The second post 46 is disposed on the other one of the pair plates 56 and is arranged to be selectively disposed in the apertures 40, 42 of the other one of the two frame members 22A-D. The ray may further comprise an elongated member 58 extending between and pivotally coupled to both of the pair of plates 54, 56, thus spanning between the two frame members 22A-D. The first and second actuators 52A, 52B are mounted to the elongated member 58 and support the tray 50 disposed above the elongated member 58.

As shown in FIGS. 1-5, the support bed 28 is further defined as a first support bed 28A and the service table 20 further comprises a second support bed 28B extending between and mounted to the two frame members 22A-D. The second support bed 28B may be similar to the first support bed 28A. Therefore, the description above regarding the first support bed 28A may be applicable to the second support bed 28B. The first and second support beds 28A, 28B are arranged to individually move along the two frame members 22A-D to accommodate varying shapes and sizes of the battery pack. More specifically, the first and second support beds 28A, 28B may be positioned to engage the battery pack near opposing side walls to widen the surface area supported by the service table 20 and increase the stability of the battery pack disposed on the service table 20. However, service table 20 may be comprised of any number of support beds 28A, 28B.

As shown in FIGS. 1 and 2, the service table 20 may further comprise a plurality of overload bars 60 extending downwardly from the frame members 22A-D for contacting the floor surface if an excessive load is applied to the support bed 28A, 28B. More specifically, the plurality of overload bars 60 extend toward, but are spaced from the floor. Deflection of the frame members 22A-D and/or the wheels 26 due to excessive load cause the overload bars 60 to engage the floor surface and support the load. The overload bars 60 prevent catastrophic failure of the service table 20 due to excessive loading, which protects the battery pack as well as the safety of the user. In the example shown in the Figures, the overload bars 60 are spaced from the floor less than one inch; however, the overload bars 60 may be spaced any suitable amount to engage the floor under excessive load.

The plurality of wheels 26 comprises four wheels 26 as shown in FIGS. 1 and 2, with the wheels 26 individually disposed adjacent the hinges 24 to facilitate pivoting of the frame members 22A-D between the service and storage configurations. The plurality of wheels 26 may comprise at least one caster wheel 62 arranged to mount to the frame members 22A-D and rotatable around a caster axis X (see FIG. 6) for turning the service table 20 on the floor surface. More specifically, the caster axis X extends substantially vertically, allowing the caster wheel 62 to turn and steer the service table 20. In the example shown in the Figures, all of the wheels 26 are arranged as caster wheels 62. However, the plurality of wheels 26 may comprise any number of caster wheels 62.

Figure 6:
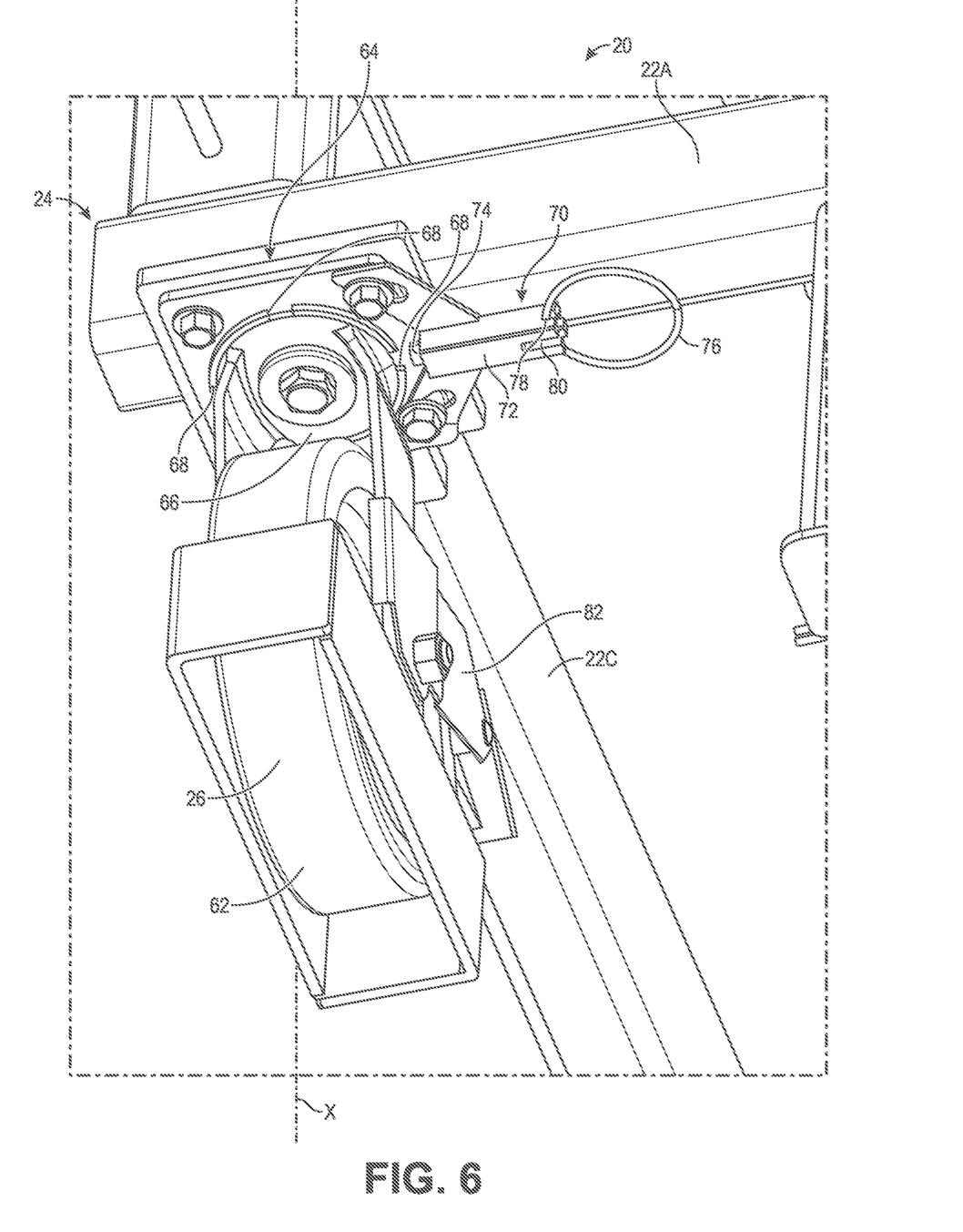
FIG. 6 is a perspective view of a portion of the service table of FIG. 1, showing a wheel configured as a caster wheel and a caster lock.

As shown in FIG. 6, the service table 20 may further comprise a caster lock 64 coupled to the caster wheel 62 for retaining the caster wheel 62 in a fixed rotational position about the caster axis X. Furthermore, the service table 20 may comprise multiple caster locks 64, each individually coupled to the caster wheels 62 and arranged to individually retain the respective caster wheel 62 in the fixed rotational position about the caster axis X. Retaining the caster wheel (s) 62 in the fixed rotational position inhibits steering of the service table 20 and may facilitate folding the service table 20 between the service and storage configurations. More specifically, the caster locks 64 may retain the caster wheels 62 in the fixed rotational position, which aligns all the wheels 26 to rotate about parallel wheel axes. The wheel axes may be parallel to the pair of end frame members 22A, 22B. Therefore, the wheels 26 allow the pair of end frame members 22A, 22B to rotate along a plane parallel to the floor surface. The hinges 24 between the end frame members 22A, 22B and the side frame members 22C, 22D allow the end and side frame members 22A-D to pivot relative to one another and causes the end frame members 22A, 22B to rotate in unison on the wheels 26. Therefore, retaining the caster wheels 62 in the fixed rotational position facilitates folding the service table 20 between the service and storage configurations.

As shown in FIG. 6, the caster lock 64 may comprise a plate 66 mounted to the caster wheel 62 and may define a plurality of notches 68 spaced about the caster axis X. The caster lock 64 may further comprise a pin 70 slidably mounted to one of the frame members 22A-D and arranged to slide into one of the notches 68 when the caster wheel 62 is in a rotational position about the caster axis X that aligns the pin 70 with the notch. Each of the notches 68 are associated with a different rotational position of the caster wheel 62. At least one of the rotational positions may correspond to the fixed rotational position in which all the wheels 26 are aligned and rotate about the parallel wheel axes. However, the rotational positions may correspond to any suitable configuration. As shown in FIG. 6, the pin 70 may comprise a housing 72 and a plunger 74 slidably disposed in the plunger 74. The plunger 74 may be biased toward the plate 66. The pin 70 may comprise a pull ring 76 fixed to the plunger 74 and configured to be grasped by a user. The user may pull the plunger 74 away from the plate 66 against the bias. The housing 72 may define a pair of opposing short channels 78 and a pair of opposing long channels 80, disposed 90 degrees from the short channels 78. The short channels 78 are configured to retain the pull ring 76 therein and hold the plunger 74 away from the plate 66 for prevent locking the caster wheel 62. The long channels 80 are configured to retain the pull ring 76 therein and allow the plunger 74 to engage the plate 66 to lock the caster wheel 62.

The service table 20 may further comprise a plurality of brakes 82, each individually operably coupled to the plurality of wheels 26. The brakes 82 are arranged to be selectively actuated and engage the wheels 26 to inhibit rotation along the floor surface. In the example shown in FIGS. 1 and 2, the plurality of wheels 26 and the plurality of brakes 82 are further defined as at least four wheels 26 and at least four brakes 82, respectively, with the wheels 26 and the brakes 82 individually disposed adjacent the hinges 24 to facilitate pivoting of the frame members 22A-D between the service and storage configurations.

In the example shown in FIGS. 1 and 2, the brakes 82 of two of the wheels 26 are configured as foot-actuated brakes 82, which may be pressed by a user's foot to activate the brake 82. Regarding the other two wheels 26, the service table 20 further comprises a brake lever 84 having a handle 86 and a linkage 88 extending along one of the frame members 22A toward the two hinges 24 mounted to the frame member 22A. The linkage 88 is coupled to the brakes 82 of the wheels 26 adjacent the two hinges 24 with the brake lever 84 and the linkage 88 arranged to simultaneously actuate the brakes 82 and engage the wheels 26. Actuation of the brake lever 84 facilitates simultaneous engagement of the two brakes 82. With the two brakes 82 engaged, the corresponding two wheels 26 and the end frame member 22A extending therebetween are prevented from moving relative to the floor surface. The other two wheels 26 (which are not braked) roll along the floor surface and facilitate the side frame members 22C, 22D and the opposing end frame member 22B pivoting about the hinges 24 between the service and storage configurations.

Figure 7:
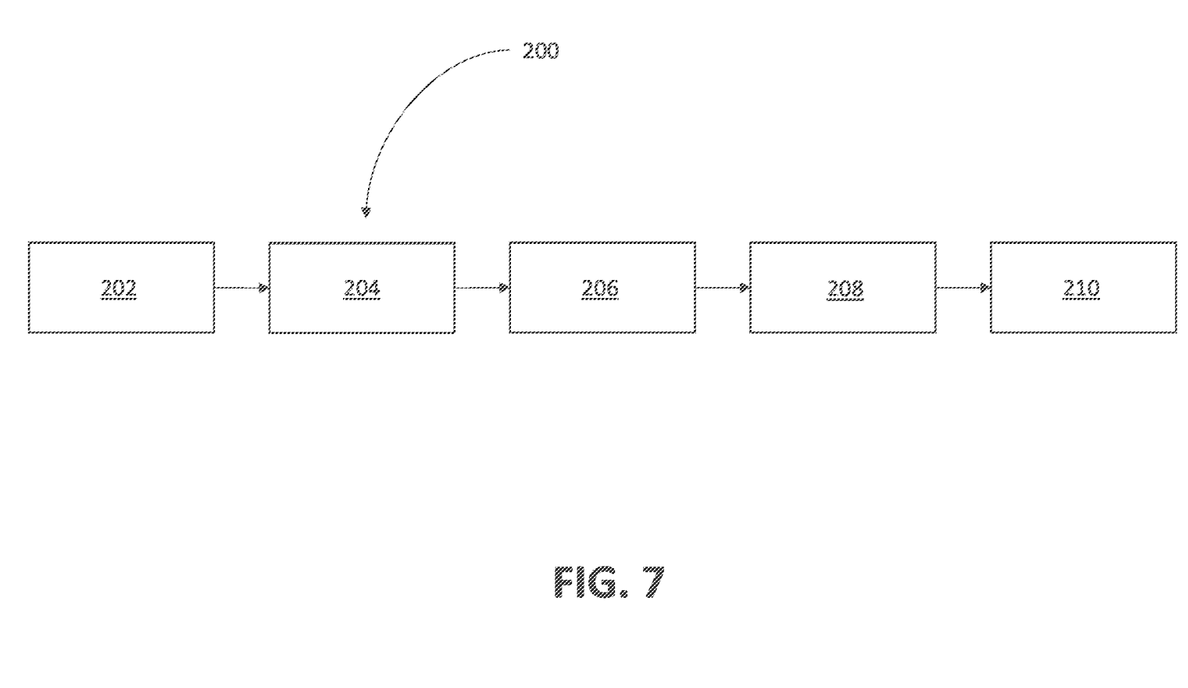
FIG. 7 is a flow chart showing a method of operating the service table to remove a battery pack from a motor vehicle.

A method 200 of operating the service table to remove the battery pack from the motor vehicle is also disclosed herein and shown in FIG. 7. The method comprises positioning the service table 20 under the vehicle and beneath the battery pack, as shown in box 202. With the service table 20 beneath the battery pack, the method further comprises extending the actuator 52 to bring the tray 50 into contact with the battery pack, as shown in box 204, and disconnecting the battery back from the chassis, as shown in box 206. The method further comprises raising the chassis until chassis is disposed above the battery pack, as shown in box 208, and moving the service table 20 and the battery pack from beneath the vehicle, as shown in box 210.

Accordingly, the service table 20 offers several advantages. The service table 20 facilitates the safe removal of the heavy battery pack from the vehicle through the support beds 28A, 28B that are adjustable to engage the battery pack and prevent the battery pack from dropping when disconnected from the chassis. The hinges 24 between the frame members 22A-D facilitate alternating the service table 20 between the service and storage configurations. The storage configuration reduces the width W2 of the service table 20, which reduces the surface area that the service table 20 occupies in the service department and increases the number of vehicles that may be serviced in the service department.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A service table for transporting a battery pack of a motor vehicle along a floor surface, the service table comprising:

at least four frame members extending longitudinally in a substantially horizontal configuration and arranged end-to-end in a circuit;

at least four hinges individually disposed between and mounted to adjacent frame members of the at least four frame members to facilitate pivoting between the adjacent frame members;

a plurality of wheels mounted to the at least four frame members and arranged to rotate along the floor surface;

a support bed that extends between and is mounted to two of the at least four frame members and is configured to support the battery pack; and at least one hinge lock, with the hinge lock disposed between the adjacent frame members and arranged to be rigidly fixed to both of the adjacent frame members in a locked configuration to inhibit pivoting of the adjacent frame members and arranged to be decoupled from at least one of the adjacent frame members in an unlocked configuration to allow pivoting of the adjacent frame members;

wherein the at least four frame members are arranged in a service configuration having a first width when the hinge lock is arranged in the locked configuration for transporting the battery pack thereon, and wherein the at least four frame members are arranged in a storage configuration having a second width, less than the first width, when the hinge lock is arranged in the unlocked configuration, wherein each of the two frame members that support the support bed define a plurality of apertures spaced from one another longitudinally along the two frame members, and the support bed further comprises a first post arranged to be selectively disposed in the apertures of one of the two frame members and a second post arranged to be selectively disposed in the apertures of the other one of the two frame members for selectively adjusting the position of the support bed along the two frame members.

2. The service table of claim 1, wherein the at least one hinge lock is further defined as multiple hinge locks individually disposed at each of the hinges.

3. The service table of claim 1, wherein the support bed is pivotally mounted to the two of the at least four frame members to facilitate the pivoting of the two of the at least four frame members at the hinges.

4. The service table of claim 1, wherein the at least four frame members comprise a pair of end frame members that are substantially parallel to one another and a pair of side frame members that are substantially parallel to one another, with the end and side frame members arranged as a parallelogram and with the pair of side frame members defining the first and second widths.

5. The service table of claim 4, wherein the pair of end frame members are orthogonal to the pair of side frame members in the service configuration and wherein the pair of end frame members are non-orthogonal to the pair of side frame members in the storage configuration.

6. The service table of claim 1, wherein the at least one hinge lock comprises a plate fixed to one of the adjacent frame members and extending toward the other one of the adjacent frame members, with each of the hinge lock and the other one of the adjacent frame members comprising a mating surface arranged to align in the service configuration to fix the plate with the other one of the adjacent frame members.

7. The service table of claim 6, wherein each of the mating surfaces define a hole, with the holes axially aligned in the service configuration, and further comprising a pin that extends through the holes in the service configuration and engages the mating surfaces to fix the plate with the other one of the adjacent frame members.

8. The service table of claim 1, further comprising a plurality of brakes, each individually operably coupled to the plurality of wheels, with the plurality of brakes arranged to be selectively actuated to engage the plurality of wheels to inhibit rotation along the floor surface.

9. The service table of claim 8, wherein the plurality of wheels and the plurality of brakes are further defined as at least four wheels and at least four brakes, respectively, with the plurality of wheels and the plurality of brakes individually disposed adjacent the at least four hinges to facilitate pivoting of the at least four frame members between the service and storage configurations.

10. The service table of claim 1, wherein the support bed further comprises a rail extending between and mounted to the two of the at least four frame members, a tray disposed above the rail, and an actuator coupled to both of the rail and the tray for positioning a height of the tray above the rail.

11. The service table of claim 10, wherein the actuator is further defined as a first actuator and the service table further comprises a second actuator spaced from the first actuator along the rail, with the first and second actuators individually vertically adjustable for adjusting an angle of the tray relative to the rail.

12. The service table of claim 10, wherein the actuator is further defined as a screw jack, with rotation of the screw jack arranged to adjust the height of the tray above the rail.

13. The service table of claim 1, wherein the plurality of wheels comprises at least one caster wheel arranged to mount to each of the at least four frame members and rotatable around a caster axis for turning the service table on the floor surface.

14. The service table of claim 13, further comprising a caster lock coupled to the at least one caster wheel for retaining the at least one caster wheel in a fixed rotational position about the caster axis.

15. The service table of claim 14, wherein the caster lock comprises a plate mounted to the at least one caster wheel and defining a plurality of notches spaced about the caster axis and a pin slidably mounted to one of the at least four frame members and arranged to slide into one of the plurality of notches when the caster wheel is in a rotational position about the caster axis that aligns the pin with the one of the plurality of notches, with the plurality of notches each associated with a different rotational position of the caster wheel.

16. A service table for transporting a battery pack of a motor vehicle along a floor surface, the service table comprising:

at least four frame members extending longitudinally in a substantially horizontal configuration and arranged end-to-end in a circuit;

at least four hinges individually disposed between and mounted to adjacent frame members of the at least four frame members to facilitate pivoting between the adjacent frame members;

a plurality of wheels mounted to the at least four frame members and arranged to rotate along the floor surface;

a support bed that extends between and is mounted to two of the at least four frame members and is configured to support the battery pack; and at least one hinge lock, with the hinge lock disposed between the adjacent frame members and arranged to be rigidly fixed to both of the adjacent frame members in a locked configuration to inhibit pivoting of the adjacent frame members and arranged to be decoupled from at least one of the adjacent frame members in an unlocked configuration to allow pivoting of the adjacent frame members;

wherein the at least four frame members are arranged in a service configuration having a first width when the hinge lock is arranged in the locked configuration for transporting the battery pack thereon, and wherein the at least four frame members are arranged in a storage configuration having a second width, less than the first width, when the hinge lock is arranged in the unlocked configuration, and wherein the support bed is further defined as a first support bed and the service table further comprises a second support bed extending between and mounted to the two of the at least four frame members, with the first and second support beds arranged to individually move along the two of the at least four frame members to accommodate varying shapes and sizes of the battery pack.

17. A service table for transporting a battery pack of a motor vehicle along a floor surface, the service table comprising:
- at least four frame members extending longitudinally in a substantially horizontal configuration and arranged end-to-end in a circuit;
- at least four hinges individually disposed between and mounted to adjacent frame members of the at least four frame members to facilitate pivoting between adjacent frame members;
- a plurality of wheels mounted to the at least four frame members and arranged to rotate along the floor surface;
- a support bed mounted to two of the at least four frame members and configured to support the battery pack; and
- at least one hinge lock, with the hinge lock disposed between the adjacent frame members and arranged to be rigidly fixed to both of the adjacent frame members in a locked configuration to inhibit pivoting of the adjacent frame members and arranged to be decoupled from at least one of the adjacent frame members in an unlocked configuration to allow pivoting of the adjacent frame members;

wherein the at least four frame members are arranged in a service configuration having a first width when the hinge lock is arranged in the locked configuration for transporting the battery pack thereon, and wherein the at least four frame members are arranged in a storage configuration having a second width, less than the first width, when the hinge lock is arranged in the unlocked configuration;

wherein the at least one hinge lock comprises a plate fixed to one of the adjacent frame members and extending toward the other one of the adjacent frame members, with each of the hinge lock and the other one of the adjacent frame members comprising a mating surface arranged to align in the service configuration to fix the plate with the other one of the adjacent frame members, with each of the mating surfaces defining a hole, with the holes axially aligned in the service configuration, and further comprising a pin that extends through the holes in the service configuration and engages the mating surfaces to fix the plate with the other one of the adjacent frame members; and wherein the support bed further comprises a rail extending between and pivotally mounted to the two of the at least four frame members to facilitate the pivoting of the at least four frame members at the hinges, a tray disposed above the rail, and an actuator coupled to both of the rail and the tray for positioning a height of the tray above the rail.

\* \* \* \* \*